(12) United States Patent
Miskovic et al.

(10) Patent No.: US 7,508,169 B2
(45) Date of Patent: Mar. 24, 2009

(54) SYSTEM AND METHOD FOR POWER CONSUMPTION MANAGEMENT DURING OPERATION OF AN ELECTRONIC DEVICE

(75) Inventors: Igor Miskovic, Malmo (SE); Sarandis Kalogeropoulos, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 755 days.

(21) Appl. No.: 10/519,809

(22) PCT Filed: Jul. 1, 2003

(86) PCT No.: PCT/EP03/06953

§ 371 (c)(1),
(2), (4) Date: Dec. 30, 2004

(87) PCT Pub. No.: WO2004/003715

PCT Pub. Date: Jan. 8, 2004

(65) Prior Publication Data

US 2006/0006842 A1 Jan. 12, 2006

Related U.S. Application Data

(60) Provisional application No. 60/394,452, filed on Jul. 8, 2002.

(30) Foreign Application Priority Data

Jul. 1, 2002 (EP) .................................. 02077578

(51) Int. Cl.
*H02J 7/00* (2006.01)
(52) U.S. Cl. .................. 320/132; 320/114; 320/134
(58) Field of Classification Search ................ 320/132, 320/114, 134; 324/435; 340/636.1
See application file for complete search history.

(56) References Cited

U.S. PATENT DOCUMENTS 5,248,929 A 9/1993 Burke ........................ 320/48

(Continued)

FOREIGN PATENT DOCUMENTS

JP 09-297166 11/1997

(Continued)

OTHER PUBLICATIONS

Summons to Attend Oral Proceedings for European Application No. 02077578.9; Nov. 28, 2007.

(Continued)

*Primary Examiner*—Akm Enayet Ullah
*Assistant Examiner*—Aaron Piggush
(74) *Attorney, Agent, or Firm*—Myers Bigel Sibley & Sajovec, P.A.

(57) ABSTRACT

A battery-driven electronic device, e.g., a radio communication terminal, which is operable in different modes with related power consumption, includes a data presentation function and a power consumption detecting function to establish current power consumption based on established current power consumption. By detecting and presenting data pertaining to the current power consumption, rather than a predetermined expected way of use, such as talk mode or standby mode, better control may be given to a user of the device so that it may be operated in such a manner so as to extend the battery life.

12 Claims, 3 Drawing Sheets

U.S. PATENT DOCUMENTS

| | | |
|---|---|---|
| 5,534,759 A | 7/1996 | Evans et al. |
| 5,764,034 A * | 6/1998 | Bowman et al. ............ 320/155 |
| 5,903,254 A | 5/1999 | Mundt et al. ................ 345/146 |
| 6,433,512 B1 * | 8/2002 | Birkler et al. ............... 320/132 |

FOREIGN PATENT DOCUMENTS

| | | |
|---|---|---|
| JP | 2001-228942 | 8/2001 |
| WO | WO 96/18178 A1 | 6/1996 |

OTHER PUBLICATIONS

Japanese Patent Application No. 2004-516762; Office Action mailed Aug. 3, 2007, 3 sheets.

* cited by examiner

SYSTEM AND METHOD FOR POWER CONSUMPTION MANAGEMENT DURING OPERATION OF AN ELECTRONIC DEVICE

RELATED APPLICATIONS

The present application is a 35 U.S.C. §371 national phase application of PCT International Application No. PCT/EP2003/006953, having an international filing date of Jul. 1, 2003, and claiming priority to European Patent Application No. 02077578.9, filed Jul. 1, 2002, and United States Provisional Application No. 60/394,452, filed Jul. 8, 2002 the disclosures of which are incorporated herein by reference in their entireties. The above PCT International Application was published in the English language and has International Publication No. WO 2004/003715 A1.

FIELD OF THE INVENTION

The present invention relates generally to electronic devices having a power supply source, such as a battery, and to solutions for visualising and controlling power consumption for optimisation of the run time before the battery needs to be replaced or recharged. The invention is however particularly suitable for portable devices, such as mobile phones.

BACKGROUND

Historically, electric devices have been powered by cable from a mains outlet or the like. However, disposable batteries have been used for a long time in portable devices, such as radio receivers and tape recorders, toys, torches etc, and in today's portable electronic devices the use of customised rechargeable batteries is clearly dominating. It is widely accepted that the development of advanced digital equipment, such as laptop computers, video cameras, personal digital assistants (PDA) and mobile phones, has led to, and also been highly dependent on, major advances in battery technology.

Any battery, rechargeable or not, has a finite duration given the power consumption circumstances. Obviously, the longer duration the better. When an electronic device is turned on but not actively used, the device is often referred to as being in standby mode. In standby mode the power consumption is generally fairly constant and well known, although it may vary e.g. due to temperature variations or the age of the battery. The estimated remaining duration, expressed in standby time, can therefore easily be calculated by withdrawing the lapsed time in standby mode from the expected total standby mode duration. Apart from standby mode, other well known modes having a more or less known associated power consumption may be defined, for which the remaining duration can be calculated in a similar manner. In mobile phones of the so-called $2^{nd}$ generation, e.g. GSM (Global System for Mobile communications), such a mode is talk mode, which is when a mobile phone is actively used for data transmission to and reception from a base station in the mobile system network. Therefore, the total time for which a $2^{nd}$ generation mobile phone can be used from a fully charged battery is often expressed in both standby time and talk-time as a technical characteristic for the device. Furthermore, information about the current remaining standby time and talk-time is generally presentable on a display of the device, such that the time to battery recharge can be estimated by the user.

Needless to say, once a part of the battery power has been consumed, the remaining useable time in the respective mode will decrease, and likewise the skilled person will realise that the total duration for which the device can be used is not the sum of the current standby time and talk-time. Furthermore, apart from the two mentioned modes, which can only be used one at a time, other functions of the device that can be simultaneously used will affect the power consumption and the total remaining duration of the battery before a recharge is needed. Such functions may be the use of the device to play games or driving a media player, such as a radio receiver, a DVD drive or an MP3 player. Furthermore, the device may e.g. be set to use an auxiliary transceiver such as a Bluetooth chip or IR transceiver, and may have display back-light capabilities. The use of any of those functions or others will obviously add to the power consumption to a more or less known degree. It would be difficult, if not impossible, to calculate the remaining time in all combinations of used functions, and it would definitely not serve any purpose to present the remaining time for all those different combinations.

Consequently, for electronic devices which can operate in different ways or modes rendering different levels of power consumption, it is often difficult for a user of the device to estimate how long a battery will last. In the case of mobile phones the two different modes identified above are generally the only ones for which the run time of the device to next recharge is given. When the user operates the device for other purposes or uses other functions the power consumption will be affected, and therefore also the remaining run time. In most mobile phones, the remaining charge of the battery can be calculated by the microprocessor of the phone, and consequently the remaining time expressed in any of the predetermined modes can be displayed, even if the phone is operated with further functions than those defined by those predetermined modes. However, the software for performing the calculations generally needs some time to sample and integrate the current power consumption in order to recalculate the estimated remaining time in e.g. standby time or talk-time. Furthermore, the remaining time is most often not given in the default window on the display, but must be fetched from a status window by some kind of command. All these factors contribute to make it difficult for the user to make a good estimate on when the battery will be empty and a recharge or battery change is needed. Furthermore, the run time experienced by the users often does match their expectations which stem from the promised standby time, since other functions have also been used even if talk-mode has not been entered.

SUMMARY OF THE INVENTION

The object of the present invention is hence to provide means for aiding users to operate a battery-driven device with an improved control over remaining battery time than known solutions provided by the state of the art. According to a first aspect of the invention, this object is fulfilled by a battery-driven electronic device which is operable in different modes with related power consumption, comprising data presentation means, wherein said device comprises power consumption detecting means for establishing current power consumption during operation of the device, and means for presenting data dependent on established current power consumption through said data presentation means. By detecting and presenting data pertaining to the current power consumption situation, rather than to a predetermined expected way of use, such as talk mode or standby mode, better control is given to a user of the device to handle it in an optimised way, preferably with a longer battery time.

In one embodiment, said device comprises means for calculating a level indicating parameter value representing the established power consumption as a parameter level value in a predetermined scale. This has the advantage of providing an indication that is easily read and understood even by a layman with little or no initial knowledge of the effect used functions or services, representing different modes, has on the battery time. Preferably, said presented data comprises said parameter level value and a preset value of said scale. This gives an even clearer message to the user, particularly if said preset value corresponds to e.g. pure talk mode, or a maximum consumption level indicative of the most power demanding mode in which the device can be operated.

In one embodiment, said device comprises means for calculating remaining battery time dependent on the established current power consumption. This way, the remaining time can be established for the mode currently running. Preferably, also the presented data comprises an indication of the calculated remaining battery time dependent on the currently running mode. The actual time remaining, if the current mode is maintained, is in this way conveniently disclosed to the used, and can be compared to remaining time expressed in the terms of predetermined modes, e.g. talk-time or standby time.

Preferably, said data presentation means comprises a display, but also a speaker may be included, optionally or additionally.

The present invention is particularly advantageous when applied in a radio communication terminal.

According to a second aspect, the present invention fulfils the stated objects by computer program product for a battery-driven device comprising a microprocessor unit and data presentation means, said computer program product including computer program code which, when executed by the microprocessor unit, triggers the microprocessor unit to detect current power consumption during operation of the device, and to present data dependent on detected current power consumption through said data presentation means. The advantages of this aspect of the invention, as well as the with the specific embodiments recited below, correspond to those of the aforementioned first aspect of the invention.

In one embodiment, the computer program product further comprises computer program code, which, when executed by the microprocessor unit, triggers the microprocessor unit to calculate a level indicating parameter value representing the detected power consumption as a parameter level value in a predetermined scale. Preferably, the computer program product of this embodiment further comprises computer program code, which, when executed by the microprocessor unit, triggers the microprocessor unit to present said parameter level value and a predetermined end value of said scale.

In one embodiment, the computer program product further comprises computer program code, which, when executed by the microprocessor unit, triggers the microprocessor unit to calculate remaining battery time dependent on the detected current power consumption. Preferably, the computer program product of this embodiment further comprises computer program code, which, when executed by the microprocessor unit, triggers the microprocessor unit to present an indication of the calculated remaining battery time dependent on the currently running mode.

Preferably, the computer program product comprises computer program code, which, when executed by the microprocessor unit, triggers the microprocessor unit to effect presentation on a display, though presentation through a speaker may be additionally or optionally included.

In a preferred embodiment, the computer program product is implemented in a radio communication terminal.

BRIEF DESCRIPTION OF THE DRAWINGS

The features and advantages of the present invention will be more apparent from the following description of the preferred embodiments with reference to the accompanying drawings, on which FIG. 1 schematically illustrates a first embodiment of a portable communication terminal on which the present invention may be applied.

DETAILED DESCRIPTION OF PREFERRED EMBODIMENTS

Figure 1:
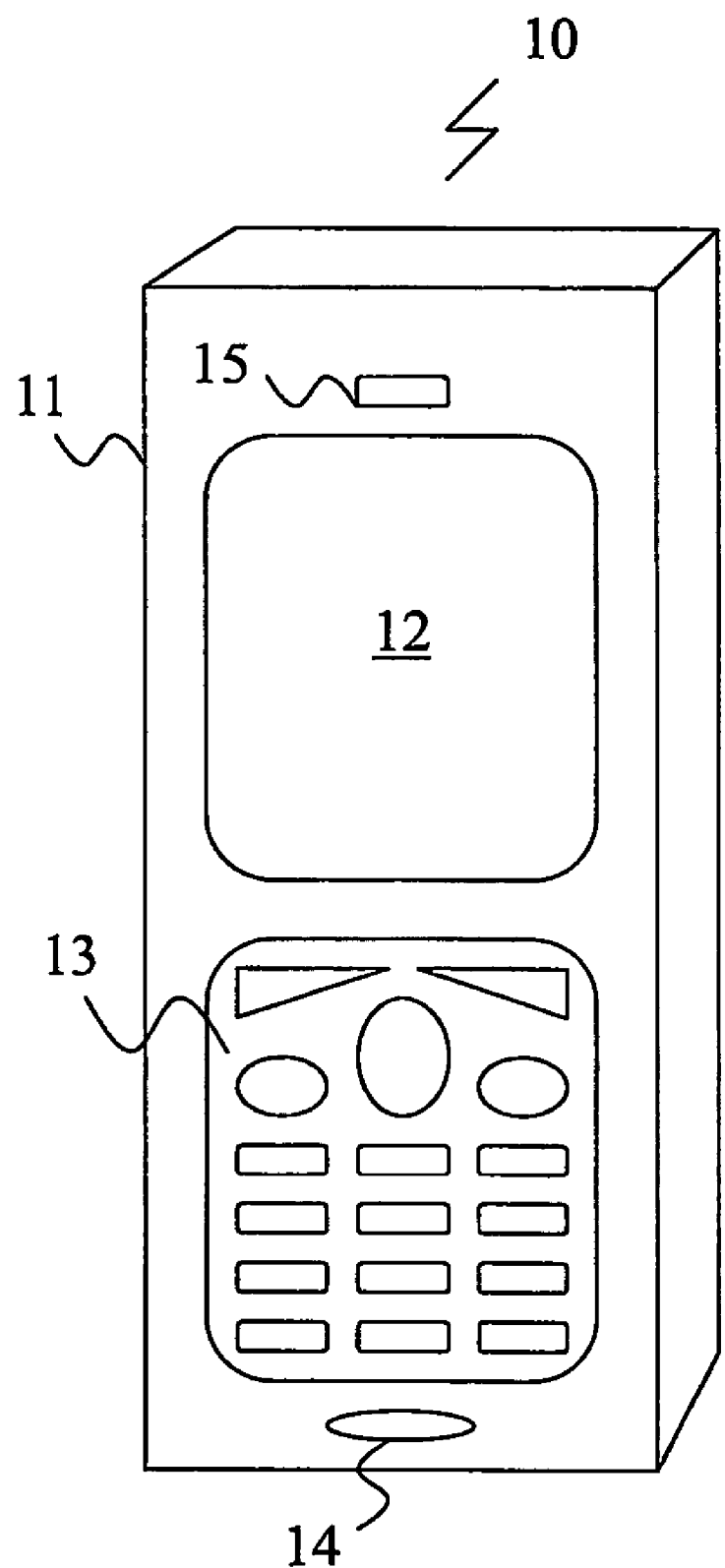

FIG. 1 shows an example of a device on which the present invention may be applied, in this case in the embodiment of a portable communication terminal 10, such as a mobile phone of more or less standard appearance. A portable communication terminal includes all mobile equipment devised for radio communication with a radio station, which radio station may also be a mobile terminal or for instance a stationary base station. Consequently, the term portable communication terminal includes mobile phones, pagers, communicators, electronic organisers, smart phones, PDA:s (Personal Digital Assistance), vehicle mounted radio communication devices or the like as well as portable laptop computer devised for wireless communication in for instance a WLAN (Wireless Local Area Network). Furthermore, since the graphical user interface of the present invention, as such, is not restricted to wireless use, it should be noted that the present invention is also applicable to standard desktop computers, television sets, fax machines or the like. The terminal 10 of FIG. 1 comprises a chassis or housing 11, carrying a user audio input in the form of a microphone 14 and a user audio output in the form of a speaker 15 or a connection to an ear piece (not shown). A set of keys, buttons or the like constitutes a data input interface 13 useable for instance for dialling according to the established art. The data output interface or data presentation means comprises a display 12 devised to present communication information to a terminal user, preferably by use of a graphical user interface. An antenna (not shown) is further included for conveying radio signals.

A device according to the invention has at least two but preferably numerous different usable functions. For the embodiment of a communication terminal 10, such a device is useable for voice communication, but may also be in standby mode in which the terminal is not actively used for communication purposes but is still in contact with the base stations of the network. In most mobile systems of today the communication is generally circuit switched, basically meaning that during a call one or more channels are allocated to and occupied by the link between the terminal and the network. Future systems will provide capability of packetized transmission, wherein the radio resources are used only during transmission. A terminal having capabilities of both these types of transmission modes will therefore have two different transmission or active modes. Furthermore, inclusion of Bluetooth or IR transceivers gives further active modes. Other functions may also be included, such as built-in games, media players and recorders, lighting capabilities, printers and so on.

Dependent on if transmission is active and what type of transmission function is used, as well as other functions which are simultaneously used, the power consumption of the device will vary. Herein, the term mode is used to denote not only an active or non-active state, as for example talk-mode and standby mode in the case of a mobile phone. Rather, any combination of simultaneously operable functions in a device defines a separate mode having a related power consumption, even though the power consumption related to a specific mode may be neither unique nor constant. The more functions in the device that are accessible for the user, the more different modes can be defined. Consequently, with the advances in useable services and functions in electronic devices such as mobile phones, it is more and more rare that the user is actually in something that can be easily defined as standby mode or talk mode, but rather in a power consumption situation somewhere in between. The estimated battery time left as presented on the terminal display is therefore not always reliable.

Figure 2:
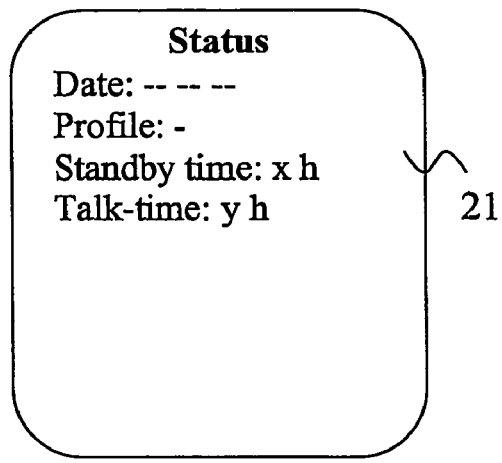
FIGS. 2-5 schematically illustrates different embodiments of a display windows on a user interface of a terminal of FIG. 1.

According to an embodiment of the present invention, the status indication of the device therefore includes a power consumption gauge. FIG. 2 illustrates the status window 21, presentable on a display 12, for a radio communication terminal according to the prior art. As previously described, the estimated time left before a battery recharge is needed is expressed in standby time x and talk-time y.

Figure 3:
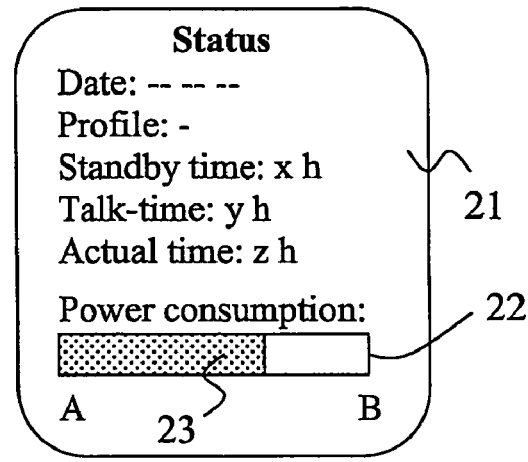

FIG. 3, however, discloses a status presentation according to an embodiment of the invention. Regardless of the present mode in which the terminal is running, the current power consumption of the battery is measured and presented on the display. The power consumption may be presented as a direct measurement of the consumption, in e.g. mA. Alternatively, and as illustrated, the consumption may be presented as a power consumption symbol 22, in which a parameter value in a predetermined scale or range is indicated. In the example of FIG. 3, the current power consumption is displayed in a scale from A to B, wherein the current level is given by a graphical filling effect 23, or e.g. a colour scale. This scale may be given in absolute numbers, such as mA, or in a less specific unit. In one embodiment a percentage scale is used, wherein the lower level A is indicated as 0%, whereas the upper scale B is indicated as 100%. According to one useable definition, 100% indicates the most demanding mode meaning the operable mode rendering the highest power consumption, whereas 0% indicates standby mode. In this case, talk mode would be somewhere between 0 and 100%, and an indication of the power consumption representative of talk mode may also be given in the gauge bar of such an embodiment, though not shown.

Furthermore, as illustrated in FIG. 3, the remaining time may be calculated for and expressed in terms of the currently used mode, and be directly displayed in the status window as actual time z. The drawing in FIG. 3 illustrates both the gauge bar 22 and the actual time indication, but other embodiments may incorporate only one of these.

Figure 4:
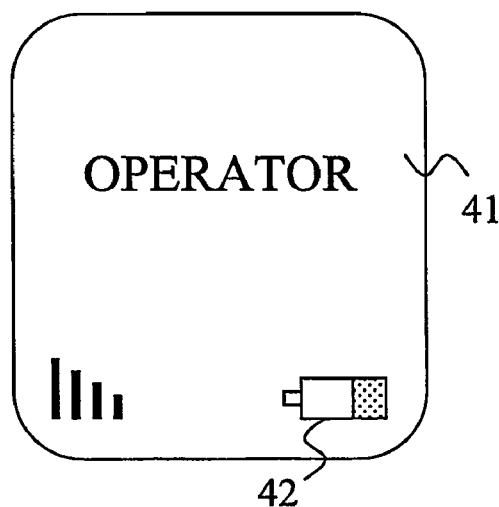

FIG. 4 illustrates the default window 41 of a radio communication terminal according to the state of the art. By default window is here meant the items shown on the terminal display when no call is in progress, i.e. in standby mode. In this window the remaining battery time is not directly given, but an indication thereof is often given by a battery symbol 42 representing of the charge level of the battery.

Figure 5:
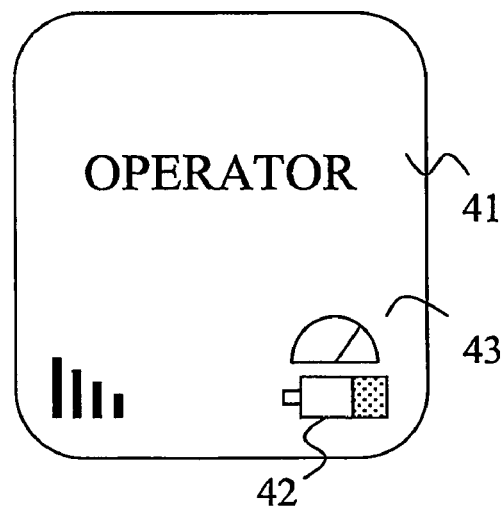

FIG. 5 discloses an embodiment of the invention, in which a power consumption symbol 43 is furthermore included in the displayed window 41. Simply to show a different way of representing the power consumption, the power consumption symbol 43 is in this drawing an analog-style gauge, in which a cursor indicates the current power consumption level in a 180° polar diagram. By implementing the power consumption in the default window 41, this information will be readily available without having to go to the status window. The power consumption symbol may also be implemented such that it is always displayed, e.g. at the bottom or the side of the displayed screen. It is clearly evident that a skilled person could come up with numerous ways of how to design the power consumption symbol 22,43, and the actual deign is not crucial for the present invention.

Both the use of a graphical illustration of the current power consumption and the calculation and presentation of the remaining time in the currently used mode serve to indicate to a terminal user how much longer he or she can expect to use the terminal before recharge, or in the case of disposable batteries, a change of battery. Even more important, the direct feedback of the power consumption makes it easier for the terminal user, who generally is a layman from a technical point of view, to understand what impact the use of different functions or services has on the total battery time. By starting or ending a certain function, i.e. entering a new mode, the effect this has on the power consumption and consequently the battery time, will be immediately conceivable for the user by viewing the displayed data. This makes it easier for the user to learn how to best use the terminal without unnecessarily restricting the battery time, and thereby to an improved power consumption management.

Figure 6:
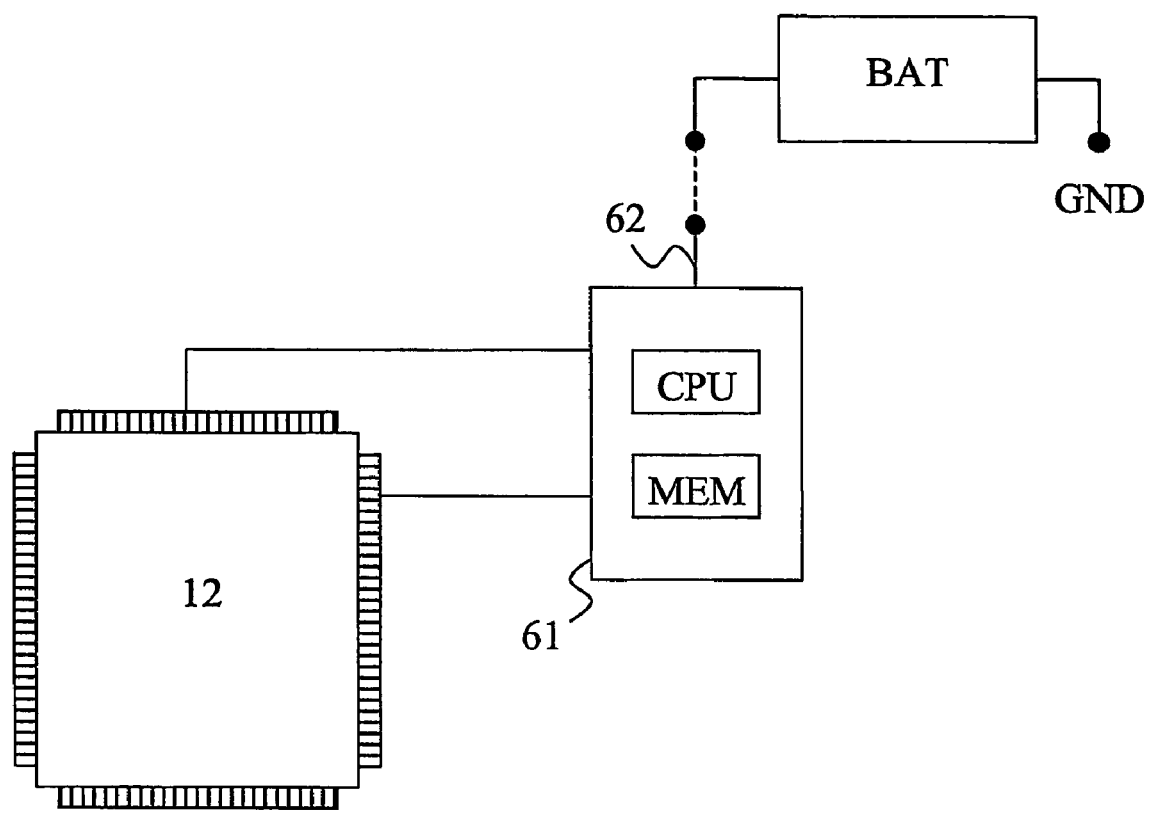
FIG. 6 illustrates by way of example a system for power consumption detection and presentation according to an embodiment of the present invention.

FIG. 6 discloses a control system for implementing the present invention in a an electronic battery-driven device. A display 12 is communicatively connected to a microprocessor unit 61, which in turn includes at least a computer processor CPU and an internal memory MEM. The hardware of the microprocessor unit is further associated with a computer program product comprising software for handling the presentation of information on the display 12, e.g. by use of a graphical user interface. A battery BAT is connectable to the device for power supply. The microprocessor unit has a connection 62 to the power supply connection from the battery BAT, such that the remaining charge in the battery can be established. When the device is operated, including standby mode, current is drained from the battery BAT to power the microprocessor unit and potentially other parts of the device. According to the invention, the microprocessor unit further comprises power consumption detecting means, basically detecting the drain rate from the battery. In the exemplary embodiment of FIG. 6 only one connection 62 between the control system of the device, embodied as the microprocessor unit, is illustrated for both charge level detection and power consumption detection. However, the skilled person realises that other constructions may be employed giving the same function. According to the invention, a computer program product comprises computer program code which can be stored in the memory MEM of the microprocessor unit 61 and which, when executed by the microprocessor unit, triggers the microprocessor unit to present data dependent on detected current power consumption on the display 12, according to what has been described in relation to FIG. 3 or 5. Said data may e.g. be a pure measured value of the current, i.e. instantaneous, power consumption. It may also be a calculated value of remaining battery time in the presently used mode. The presented data may also be a level indication, obtained by calculating a parameter value representing the detected power consumption as a parameter level value in a given scale.

The description above relates to the data presentation means as being a display, but in alternative embodiments said data presentation means may include a speaker 15, wherein presentation of power consumption related information as defined herein is conveyed by sound.

The foregoing has described the principles, preferred embodiments and modes of operation of the present invention. However, the above described embodiments should be regarded as illustrative rather than restrictive, and it should be appreciated that variations may be made in those embodiments by persons skilled in the arts without departing from the scope of the present invention as defined by the following claims.

The invention claimed is:

1. A battery-driven electronic device, comprising
   means for detecting power consumption that is configured to establish present power consumption during operation of the device;
   means for presenting data based on the established current power consumption;
   means for calculating a level indicating parameter value representing the established current power consumption as a consumption level in a predetermined scale; and
   wherein said presented data comprises an indication of said consumption level in said scale.

2. The battery-driven device as recited in claim 1, wherein said presented data comprises said level indicating parameter value and a preset value of said scale.

3. The battery-driven device as recited in claim 1, further comprising:
   means for calculating remaining battery time based on the established current power consumption.

4. The battery-driven device as recited in claim 3, wherein said presented data comprises an indication of the calculated remaining battery time based on a current mode of the device.

5. The battery-driven device as recited in claim 1, wherein said means for presenting data comprises a display.

6. The battery-driven device as recited in claim 1, wherein said device is a radio communication terminal.

7. A computer program product for a battery-driven device comprising:
   a computer readable storage medium having computer readable program code embodied therein, the computer readable program code comprising:
   computer readable program code configured to detect present power consumption during operation of the device;
   computer readable program code configured to calculate a level indicating parameter value representing the detected present power consumption as a consumption level in a predetermined scale; and
   computer readable program code configured to present an indication of said consumption level in said scale.

8. The computer program product as recited in claim 7, further comprising:
   computer readable program code configured to present said level indicating parameter value and a predetermined end value of said scale.

9. The computer program product as recited in claim 7 further comprising:
   computer readable program code configured to calculate remaining battery time based on the detected present power consumption.

10. The computer program product as recited in claim 9, further comprising:
    computer readable program code configured to present an indication of the calculated remaining battery time based on a current mode of the device.

11. The computer program product as recited in claim 7, wherein said computer readable program code configured to present comprises computer readable program code configured to present said indication of said consumption level in said scale on a display.

12. The computer program product as recited in claim 7, wherein said battery-driven device is a radio communication terminal.

* * * * *